United States Patent
Plante et al.

(10) Patent No.: US 9,863,270 B2
(45) Date of Patent: Jan. 9, 2018

(54) TURBOMACHINE CASING

(71) Applicant: SNECMA, Paris (FR)

(72) Inventors: Romain Plante, Fontainebleau (FR); Romain Coulon, Orvault (FR); Geoffroy De La Chapelle, Nantes (FR); Paul Follin, Nantes (FR); Florent Rognin, Massy (FR)

(73) Assignee: SNECMA, Paris (FR)

( * ) Notice: Subject to any disclaimer, the term of this patent is extended or adjusted under 35 U.S.C. 154(b) by 290 days.

(21) Appl. No.: 14/440,388

(22) PCT Filed: Nov. 4, 2013

(86) PCT No.: PCT/FR2013/052624
§ 371 (c)(1),
(2) Date: May 4, 2015

(87) PCT Pub. No.: WO2014/068261
PCT Pub. Date: May 8, 2014

(65) Prior Publication Data
US 2015/0267555 A1    Sep. 24, 2015

(30) Foreign Application Priority Data

Nov. 5, 2012  (FR) ...................... 12 60495

(51) Int. Cl.
*F01D 21/04* (2006.01)
*F01D 25/04* (2006.01)
(Continued)

(52) U.S. Cl.
CPC .............. *F01D 25/04* (2013.01); *B64D 29/06* (2013.01); *F01D 25/243* (2013.01);
(Continued)

(58) Field of Classification Search
CPC .... F01D 21/045; F01D 25/243; F01D 25/246; F01D 25/04; F01D 11/125; F01D 11/127;
(Continued)

(56) References Cited

U.S. PATENT DOCUMENTS 6,123,170 A    9/2000   Porte et al.
6,206,631 B1   3/2001   Schilling
(Continued)

FOREIGN PATENT DOCUMENTS

EP   0 898 063 A1   2/1999
EP   1 083 300 A2   3/2001
(Continued)

OTHER PUBLICATIONS

International Search Report dated Feb. 17, 2014 in PCT/FR2013/052624 Filed Nov. 4, 2013.

*Primary Examiner* — Woody Lee, Jr.
*Assistant Examiner* — Behnoush Haghighian
(74) *Attorney, Agent, or Firm* — Oblon, McClelland, Maier & Neustadt, L.L.P.

(57) ABSTRACT

A turbomachine casing including a substantially cylindrical wall and an annular one-piece acoustic insulation panel mounted inside the wall, the panel including an annular surface that is radially external opposite a radially internal annular surface of the wall, wherein the wall includes on its internal angular surface first projecting members which bear axially against second projecting members belonging to the external annular surface of the panel and which are fixed to these second members in a dismountable manner.

9 Claims, 2 Drawing Sheets

(51) Int. Cl.
*F01D 25/24* (2006.01)
*F02K 3/06* (2006.01)
*F02C 7/045* (2006.01)
*B64D 29/06* (2006.01)
*F02C 7/05* (2006.01)
*B64D 33/02* (2006.01)
*F01D 11/12* (2006.01)

(52) U.S. Cl.
CPC ............ *F01D 25/246* (2013.01); *F02C 7/045* (2013.01); *F02K 3/06* (2013.01); *B64D 33/02* (2013.01); *B64D 2033/0206* (2013.01); *F01D 11/125* (2013.01); *F01D 11/127* (2013.01); *F01D 21/045* (2013.01); *F02C 7/05* (2013.01); *F05D 2250/283* (2013.01); *F05D 2260/96* (2013.01); *Y02T 50/672* (2013.01)

(58) Field of Classification Search
CPC .... F02C 7/045; F02C 7/05; B64D 2033/0206; B64D 33/02; B64D 29/06

USPC ......................................................... 138/114
See application file for complete search history.

(56) References Cited

U.S. PATENT DOCUMENTS

| | | | |
|---|---|---|---|
| 6,382,905 | B1 | 5/2002 | Czachor et al. |
| 9,169,728 | B2 * | 10/2015 | Wallace ................. F01D 21/04 |
| 2005/0252195 | A1 | 11/2005 | Porte et al. |
| 2008/0206044 | A1 | 8/2008 | Porte et al. |
| 2010/0320316 | A1 * | 12/2010 | Vauchel ................. B64D 33/02 244/1 N |
| 2014/0321999 | A1 | 10/2014 | Guilbert et al. |

FOREIGN PATENT DOCUMENTS

| | | |
|---|---|---|
| EP | 1 591 643 A1 | 11/2005 |
| FR | 2 926 791 A1 | 7/2009 |
| GB | 2 361 747 A | 10/2001 |

* cited by examiner

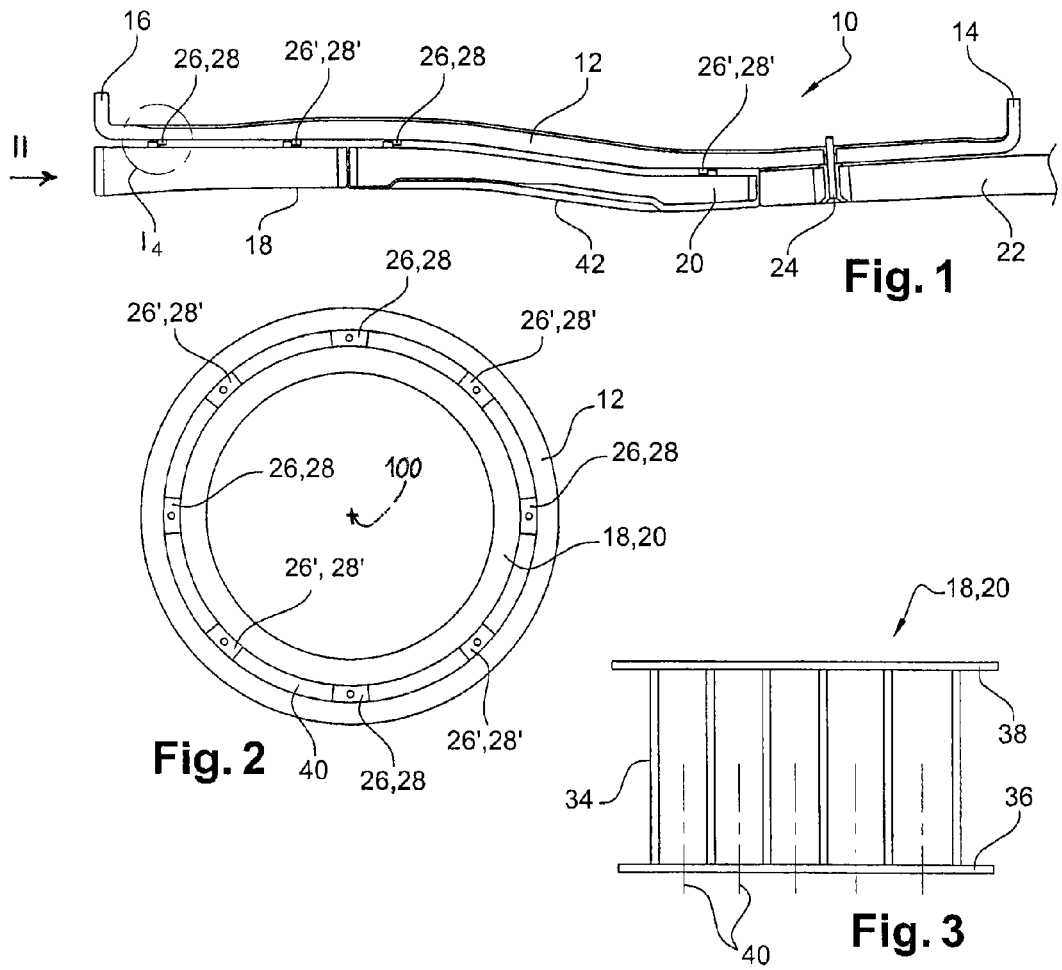
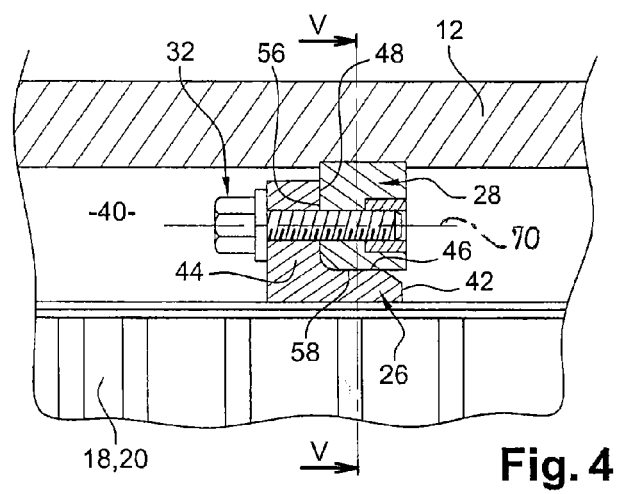

TURBOMACHINE CASING

BACKGROUND OF THE INVENTION

Field of the Invention

The present invention relates to a turbomachine casing, more particularly a turbomachine such as a turbojet or a turboprop engine in a plane.

Description of the Related Art

A fan casing typically comprises a substantially cylindrical wall which extends about the turbomachine fan blades, and the internal surface of which is covered with acoustic insulation panels. Such panels generally comprise an annular honeycomb structure the internal and external surfaces of which are each covered with a skin which can be multi-perforated to improve the acoustic treatment. They are intended to absorb the sound waves generated by the fan of the turbomachine.

The applicant's previous applications EP-A1-2318679, EP-A1-2,088,290 and FR-A12965859 describe acoustic insulation panels of this type.

An acoustic insulation panel in a turbomachine is generally sectorized, i.e. formed of several panel sectors circumferentially arranged end-to-end and secured to the casing wall by gluing or fixing screws which extend radially with respect to the longitudinal axis of the turbomachine. Fixing the sectors by screwing has disadvantages in that it requires using many fixing screws which, on the one hand, increase the weight of the turbomachine and are liable to damage the fan blades in case of loss or breakage. On the other hand, more or less wide interface areas between the sectors induce alternating smooth and treated areas in the vicinity of the fan (and thus the creation of acoustic impedance discontinuities), which cause an increase in the noise levels in the turbomachine for some operating conditions. Besides, mounting the numerous fixing screws on the panels requires the provision therein of densified zones that affect the acoustical effectiveness.

In order to limit the number of fixing screws, the above-mentioned patent application FR-A1 2,935,017 provides to extend the fan casing and to fix an annular one-piece acoustic insulation panel on the casing wall and the air inlet duct. In practice, the maintenance of such an acoustic panel is difficult to achieve since the turbomachine has to be immobilized to substitute a new panel for the damaged panel.

Furthermore, a casing wall may be deformed and have an internal surface which is not perfectly cylindrical. This is more particularly the case in a casing wall made of a composite material which, because of the method used for the manufacturing thereof, may have relatively important manufacturing tolerances. In the currently available technique, the acoustic panels which are fixed on a casing wall of this type do not make it possible to compensate the above-mentioned tolerances.

This is more particularly the case for acoustic insulation panels which are glued to the casing wall by means of a hot-setting adhesive. Implementing such gluing is long (several hours are requested in a large-sized autoclave) and, if the panel is damaged, the engine must be dismounted prior to replacing the panel.

BRIEF SUMMARY OF THE INVENTION

The present invention makes it possible to remedy at least some of the above-mentioned drawbacks in a simple, efficient and economical way.

For this purpose, it provides for a turbomachine casing having a longitudinal axis and comprising a substantially cylindrical wall and an annular one-piece acoustic insulation panel mounted inside the wall, about said longitudinal axis, with the panel comprising an annular surface which is radially external opposite a radially internal annular surface of the wall, characterized in that the wall comprises, on its internal annular surface, first projecting members which are supported parallel to said longitudinal axis by said second projecting members of the external annular surface of the panel and which are fixed to such second members in a dismountable or removable manner.

The present invention thus provides a new system for fixing a one-piece acoustic insulation panel on a casing wall. As the panel is formed of a single annular piece (called OPB, the acronym for One Piece Barriel), no discontinuity in acoustic impedance occurs on the whole surface. Besides, the panel fixing means do not significantly increase the weight of the casing and do not go through the whole radial dimension of the panel. No discontinuity is thus created in the acoustic insulation. Furthermore, as will be described in greater details hereafter, the invention facilitates the mounting and enables the dismounting of the panel, in particular under the wing of an aircraft equipped with the turbomachine (i.e. without having to dismount the engine), and further optimizes the jet tolerances in that it enables to adjust the possible cylindricality defects in the casing wall (from +/−2 mm up to +/−0.4 mm in a particular embodiment of the invention).

The one-piece panel may comprise an annular honeycomb structure the internal and external surfaces of which are covered with a skin, with the internal skin being preferentially of the multi-perforated type.

The first members may be fixed to the second members by means of the screw-nut type. Such means of the screw-nut type advantageously extend parallel to the longitudinal axis of the casing. The panel mounting and dismounting tool then comprises a screwing/unscrewing tool which is intended to be axially inserted between the casing wall and the panel.

According to another characteristic of the invention, the first and second members comprise mounting lugs. Such lugs may be formed integral with the wall and the panel, respectively, or be fixed to the wall and the panel, respectively, for example by gluing, welding, screwing or riveting.

The wall and the panel may each comprise at least one annular row of lugs regularly distributed about the longitudinal axis of the casing. They may for example each comprise two annular rows of lugs, with the lugs of the first row being preferably angularly offset with respect to the second row of lugs for an easy mounting thereof. Each row includes for example twelve lugs.

At least a part of the lugs may be substantially L-shaped. Such lugs may include a substantially flat or cylindrical part intended to be fixed or made integral with one of the elements among the wall and the panel, and a substantially radial part having a hole intended to be gone through by a fixing means.

The lugs of the wall may be at least partially accommodated in recesses in the internal annular surface of the wall, and/or the lugs of the panel may be at least partially accommodated in recesses in the external annular surface of the panel.

The lugs advantageously each comprise a radial surface for bearing on another lug and a flat or substantially cylindrical centring surface intended to cooperate with said other lug.

The flat or cylindrical surfaces of the lugs of the wall are preferably made of a machinable material so as to correct a possible defect, if any, of cylindricality of the internal annular surface of the wall.

In the mounting position, the panel can be separated from the wall by an annular space, which has for example a thickness or a radial dimension of the order of about 10 mm.

The present invention also relates to a turbomachine, such as a turbojet or a turboprop engine, characterized in that it comprises a casing as described above.

BRIEF DESCRIPTION OF THE SEVERAL VIEWS OF THE DRAWINGS

Other advantages and characteristics of the invention will appear upon reading the following description given by way of not restrictive example and while referring to the appended drawings wherein:

FIG. 1 is a schematic half-view in axial section of a turbomachine fan casing according to the invention;

FIG. 2 is a front view, from upstream, of the casing of FIG. 1 (axial arrow II in FIG. 1);

FIG. 3 is a partial schematic half-view of an acoustic insulation panel in axial section (thus along the longitudinal axis of the casing);

FIG. 4 is an enlarged view of the detail $I_4$ in FIG. 1, and shows means for fixing an acoustic insulation panel;

DETAILED DESCRIPTION OF THE INVENTION

Figure 5:
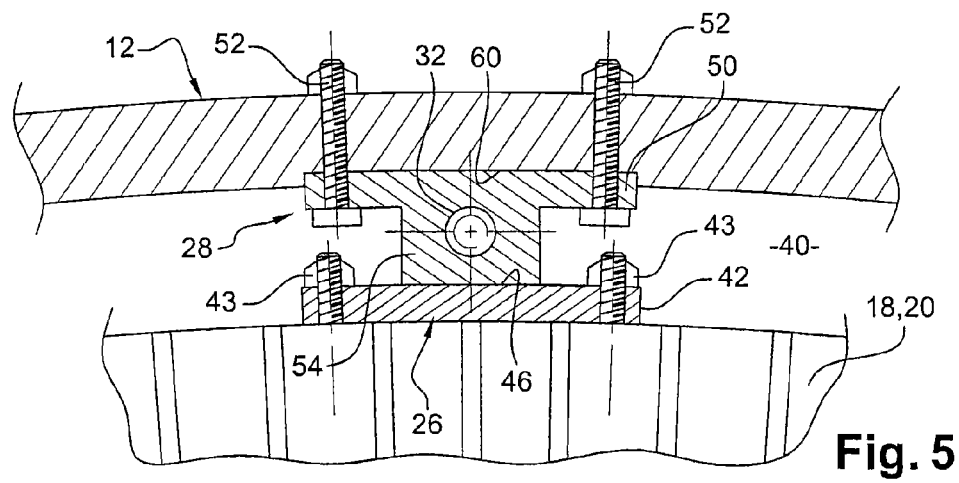
FIG. 5 is a schematic sectional view along the V-V line of FIG. 4 (a section perpendicular to the longitudinal axis of the casing)

Reference is first made to FIG. 1 which shows a fan casing 10 of a turbomachine such as a turbojet or a turboprop engine, with such casing belonging to a nacelle which surrounds the engine of the turbomachine and inside which a fan rotates which generates a secondary air flow which circulates between the nacelle and the engine and forms a part of the thrust generated by the turbomachine.

The casing 10 comprises a substantially cylindrical wall 12 which comprises fixing annular flanges 14, 16 at its longitudinal ends. The downstream flange 14 is secured by means of the screw-nut type to a flange (not shown) of an intermediate casing and the upstream flange 16 is secured by means of the screw-nut type to a flange (not shown) of an air inlet duct in the nacelle.

The casing comprises acoustic insulation annular panels 18, 20, 22 which cover the cylindrical internal surface of the wall 12 and which are fixed to same wall.

In the example shown, the wall 12 carries three annular panels 18, 20, 22, two respectively upstream and median one-piece panels 18, 20 according to the invention, and a downstream panel 22 which is sectorized according to the prior art.

The downstream panel 22 comprises panel sectors which are positioned circumferentially end-to-end and which are fixed to the wall 12 by screws 24 which radially go through the sectors and are engaged in holes of the wall 12. Such fixing system has many disadvantages described above.

The invention makes it possible to remedy such drawbacks thanks to annular one-piece (i.e. not sectorized) panels 18, 20 which are fixed to the wall 12 using a new technology which enables the dismounting of the panels, in particular under the wing of an aircraft during a maintenance operation.

In the example shown in FIGS. 1 to 5, the panels 18, 20 are mounted inside the wall 12 and secured to same wall by means of the screw-nut type, with each panel comprising lugs 26 for axially (axis 70 in FIG. 4) and radially bearing on lugs 28 of the wall 12, with such lugs comprising holes for the means 32 of the screw-nut type to go therethrough.

FIG. 3 shows an exemplary embodiment of a panel 18, 20 according to the invention, with such panel comprising an annular honeycomb structure 34, the internal and external surfaces of which are each covered with a laminated skin 36, 38, with such internal skin 36 comprising multiple perforations 40. The panel may further comprise a layer of an abradable material, especially in the area of the panel surrounding the fan blades, as is the case in the panel which comprises an internal layer 42 made of an abradable material under its internal skin 36 (see FIG. 1).

As shown in FIG. 2, each panel 18, 20 is formed in one piece without discontinuity, with the lugs 26 being fixed to the external skin 38 of the panel and being located in an annular space 40 which extends between the panel 18 20 and the wall 12. Such annular space may have a thickness or a radial dimension of the order of 10 mm.

The longitudinal axis of the casing which is also that of the cylindrical wall 12 and of the panel 18, 20 is referred to by number 100.

It should be noted that the wall 12 and the panel are coaxial.

The panel 18, 20 extends about the longitudinal axis 100.

Each panel 18, 20 is equipped with two annular rows of lugs, an upstream row of lugs 26, 28 and a downstream row of lugs 26', 28'. The lugs in each row are regularly distributed about the longitudinal axis of the casing and are diametrically opposed in pairs. The lugs 26, 28 of the upstream row are further angularly offset with respect to the lugs 26', 28' of the downstream row, with respect to the longitudinal axis of the casing (FIG. 2). Each row comprises for example twelve lugs 26, 26', 28, 28'.

The lugs 26 carried by the panel 18, 20 are substantially L-shaped and each comprise a longitudinal part 42 applied to the external skin 38 of the panel and fixed to such skin by screws 43 cooperating with hub nuts of the self-locking type (FIG. 5). Such longitudinal part 42 has the shape of a cylindrical portion and follows the external shape of the panel.

One of the longitudinal ends of the part 42 of the lug 26 is connected to a substantially radial part 44 which extends outwardly and which comprises a hole for the screw 32 (axis 70) to go therethrough.

The part 42 of the lug 26 comprises a radially external bearing surface 46 having a cylindrical shape and the radial part 44 comprises a radial bearing surface 48.

As can be seen in FIG. 5, the part 44 of the lug 26 has a circumferential dimension smaller than that of its part 42.

The lugs 28 carried by the wall 12 each comprise a radially external substantially flat portion 50 applied to the radially internal surface of the wall 12 and fixred thereto by screws 52 cooperating with hub nuts of the self-locking type, and a part 54 which extends radially inwardly and which comprises a through-hole aligned with the hole in the lug 26 for the screw 32 fixing such lugs to go therethrough.

Such part 54 comprises a radial surface 56 (axis 70 parallel to the axis 100 of the casing) for axially bearing on the radial surface 48 of the lug 26 and a flat 58 or substantially cylindrical surface bearing on the cylindrical surface 46 of the lug 26.

As can be seen in FIG. 5, the part 54 of the lug 28 has a circumferential dimension smaller than that of its part 50. Besides, the part 50 of the lug 28 is partially engaged into a recess 60 having a shape matching that of the wall 12.

Figure 6:
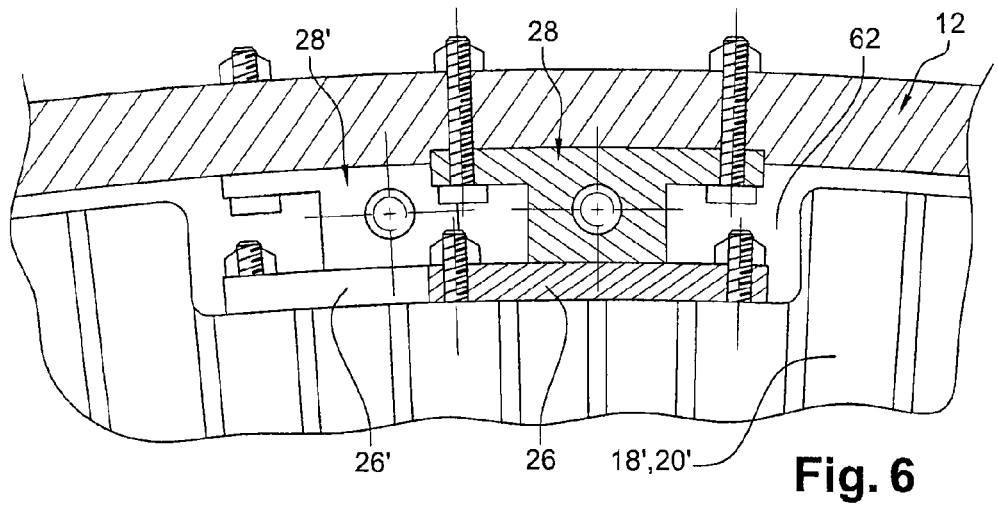
FIG. 6 is a schematic view corresponding to FIG. 5 and showing an alternative embodiment of the invention.

The thickness of the panel 18, 20 honeycomb structure 34 could be increased so as to improve the acoustic insulation performances thereof. In the present case, this can be achieved by increasing the external diameter of the panel. The lugs 26 of the panel would then be accommodated in longitudinal grooves 62 of the radially external surface of the panel 18', 20', as schematically shown in FIG. 6. This figure also shows the above-mentioned angular offset between a lug 26 of an upstream annular row and a lug 26' of a downstream annular row of the panel 18', 20', with such lugs 26, 26' being accommodated in the same groove 62 of the panel.

The panels 18, 20 described above may be mounted inside the wall 12 of the casing as follows.

Each panel 18, 20 is positioned upstream of the wall 12, coaxially thereto, and is positioned angularly about the longitudinal axis of the casing so that such lugs 26, 26' are axially aligned with those 28, 28' of the casing. The panel is then displaced in axial translation in the downstream direction until it is accommodated inside the wall and its lugs 26, 26' are axially bearing on those 28, 28' of the casing.

A tool such as a ratchet wrench equipped with an extension is then used to screw the screws 32 into the lugs to secure the panel to the casing. Such tool is inserted axially from upstream into the annular space 40 which extends between the panel and the wall. If this space 40 does not have a sufficient radial dimension and if the lugs of the panel are accommodated in longitudinal grooves 62 of the panel 18', 20', the screws can be accessed through the tool or the extension thereof in the groove of the panel.

Figure 7:
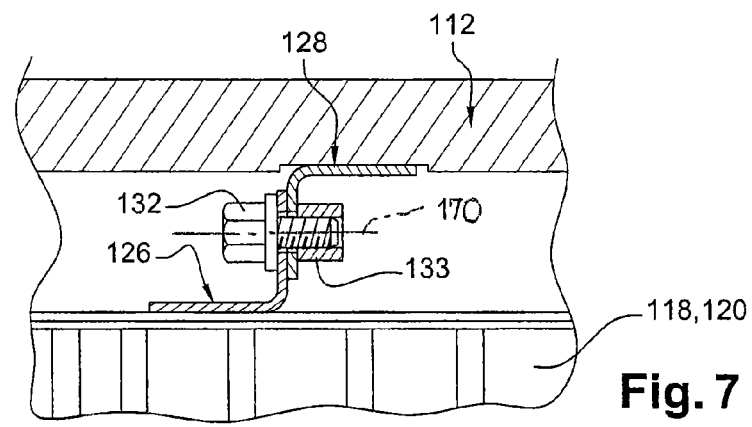
FIG. 7 is a schematic view corresponding to FIG. 4 and showing another alternative embodiment of the invention.

FIG. 7 shows an alternative embodiment of the invention which is different from the previously described embodiment in that the lugs 126, 128 are here formed with sheet metals folded into an L-shape. The lug 126 carried by the panel 118, 120 comprises a longitudinal part fixed to the external skin of the panel and a radial part axially bearing (axis 170 parallel to that of the casing 100) on a radial part of the other lug 128, a longitudinal part of which is fixed to the internal surface of the wall of the casing 112.

The radial parts of the lugs 126, 128 each comprise a hole. The hole in the lug 128 receives a hub nut 133. A screw 132 is axially engaged (axis 170) into the hole of the lug 126 and is then screwed into the nut 133 carried by the lug 128 for fixing the lugs together. This operation is performed for each pair of lugs 126, 128 so as to secure the panel 118 120 to the wall 112.

The invention claimed is:

1. A turbomachine casing haying a longitudinal axis and comprising:
    a substantially cylindrical wall; and
    an annular one-piece acoustic insulation panel mounted inside the substantially cylindrical wall, about said longitudinal axis, the acoustic insulation panel comprising an external annular surface which is radially external opposite a radially internal annular surface of the substantially cylindrical wall,
    wherein the radially internal annular surface of the substantially cylindrical wall comprises first projecting members which are supported parallel to said longitudinal axis by second projecting members of the external annular surface of the acoustic insulation panel and which are fixed to such second projecting members in a removable manner, and
    wherein the first and second projecting members comprise fixing lugs located in a space which extends between said acoustic insulation panel and said substantially cylindrical wall, said fixing lugs being distributed radially around said longitudinal axis so as to form annular rows of lugs, the respective annular rows of lugs being axially spaced one from another.

2. The casing according to claim 1, wherein the first projecting members are fixed to the second projecting members via screw-nuts.

3. The casing according to claim 2, wherein each of the screw-nuts extends parallel to the longitudinal axis of the casing.

4. The casing according to claim 1, wherein the fixing lugs are foil wed in one piece with the substantially cylindrical wall and the acoustic insulation panel, respectively, or are fixed to the substantially cylindrical wall and to the acoustic insulation panel, respectively.

5. The casing according to claim 1, wherein the lugs of the substantially cylindrical wall are at least partly accommodated in recesses of the internal annular surface of the substantially cylindrical wall, and/or the lugs of the acoustic insulation panel are at least partly accommodated in grooves of the external annular surface of the acoustic insulation panel.

6. The casing according to claim 1, wherein the lugs each comprise a radial surface for bearing on another lug and a flat or substantially cylindrical centering surface intended to cooperate with said another lug.

7. The casing according to claim 6, wherein the flat or cylindrical surfaces of the lugs of the substantially cylindrical wall are made of a machinable material so as to correct a possible defect, if any, of cylindricality of the internal annular surface of the substantially cylindrical wall.

8. A turbomachine comprising a casing according to claim 1.

9. A turbomachine casing having a longitudinal axis and comprising:
    a substantially cylindrical wall; and
    an annular one-piece acoustic insulation panel mounted inside the substantially cylindrical wall, about said longitudinal axis, the acoustic insulation panel comprising an external annular surface which is radially external opposite a radially internal annular surface of the substantially cylindrical wall,
    wherein the radially inner annular surface of the substantially cylindrical wall comprises first projecting members which are supported parallel to said longitudinal axis by second projecting members of the external annular surface of the acoustic insulation panel and which are fixed to such second projecting members in a removable manner,
    wherein the first and second projecting members comprise fixing lugs, the first projecting members are fixed to the second projecting members via screw-nuts, and
    wherein said screw-nuts each extend parallel to the longitudinal axis of the casing, and said screw-nuts are radially distributed on lugs forming annular rows of lugs, said annular rows of lugs being axially spaced one from another.

* * * * *

UNITED STATES PATENT AND TRADEMARK OFFICE
CERTIFICATE OF CORRECTION

PATENT NO. : 9,863,270 B2
APPLICATION NO. : 14/440388
DATED : January 9, 2018
INVENTOR(S) : Romain Plante et al.

It is certified that error appears in the above-identified patent and that said Letters Patent is hereby corrected as shown below:

In the Claims

Column 6, Line 19, Claim 4 change "are foil wed in one" to --are formed in one--.

Signed and Sealed this
Sixteenth Day of April, 2019

Andrei Iancu
*Director of the United States Patent and Trademark Office*